United States Patent [19]

Teraoka et al.

[11] Patent Number: 5,083,986
[45] Date of Patent: Jan. 28, 1992

[54] COUPLING APPARATUS WITH DOUBLE CLUTCHES

[75] Inventors: Masao Teraoka; Sakuo Kurihara; Isao Hirota, all of Tochigi, Japan

[73] Assignee: Tochigifujisangyo Kabushiki Kaisha, Japan

[21] Appl. No.: 555,267

[22] Filed: Jul. 18, 1990

[30] Foreign Application Priority Data

| Jul. 20, 1989 | [JP] | Japan | 1-185869 |
| Aug. 28, 1989 | [JP] | Japan | 1-218549 |
| Jan. 31, 1990 | [JP] | Japan | 2-18847 |
| Mar. 28, 1990 | [JP] | Japan | 2-77043 |

[51] Int. Cl.⁵ .................................. F16H 1/44
[52] U.S. Cl. .................................. 475/86; 192/35; 192/58 C
[58] Field of Search ............ 192/21.5, 35, 48.2, 192/58 C, 70.23; 472/85, 86, 145, 249

[56] References Cited

U.S. PATENT DOCUMENTS

| 2,937,729 | 5/1960 | Sperr, Jr. | 192/35 X |
| 3,404,585 | 10/1968 | Roper | 192/58 C X |
| 3,831,462 | 9/1974 | Baremor | 74/711 |
| 4,031,780 | 6/1977 | Dolan et al. | 192/58 C X |
| 4,058,027 | 11/1977 | Webb | 192/58 C X |
| 4,645,049 | 2/1987 | Matsuda et al. | 192/35 |
| 4,718,303 | 1/1988 | Fogelberg | 74/710.5 |
| 4,750,382 | 6/1988 | Marc | 475/85 |
| 4,781,078 | 11/1988 | Blessing et al. | 192/48.2 X |
| 4,876,921 | 10/1989 | Yasui et al. | 475/86 |
| 4,896,754 | 1/1990 | Carlson et al. | 192/21.5 |
| 4,966,249 | 10/1990 | Imaseki | 475/86 X |
| 4,974,696 | 12/1990 | Miyajima et al. | 475/86 X |

FOREIGN PATENT DOCUMENTS

| 2209879 | 9/1972 | Fed. Rep. of Germany . |
| 3612189 | 10/1987 | Fed. Rep. of Germany . |
| 1333878 | 10/1973 | United Kingdom . |

OTHER PUBLICATIONS

Automobile Engineer, vol. 49, No. 4, Apr. 1959, London GB, pp. 148-149-"Differential Lock".

Primary Examiner—Dirk Wright
Attorney, Agent, or Firm—Darby & Darby

[57] ABSTRACT

To stably control clutch engagement torque of a multi-disk friction plate clutch provided between two rotary members, without being directly subjected to the influence of friction plate wear or of fluctuations in friction coefficient between two clutch plates, the coupling apparatus comprises a pilot clutch, a main clutch and dual cam ring members disposed between the two clutches. When the pilot clutch is engaged by an actuator in a first direction, since a first slidable cam ring rotation is limited by the pilot clutch relative to a second fixed cam ring, the first slidable cam ring is shifted in a second opposite direction by a cam thrust force to engage the main clutch. The coupling apparatus is suitably incorporated in a differential gear assembly mounted on automotive vehicles in order to controllably and stably limit the differential motion between two shafts.

5 Claims, 9 Drawing Sheets

COUPLING APPARATUS WITH DOUBLE CLUTCHES

BACKGROUND OF THE INVENTION

1. Field of the Invention

The present invention relates to a coupling apparatus provided with double clutches which is connected between first and second rotary shafts to transmit power from the first shaft to the second shaft or vice versa, and in particular suitable for use with a differential gear assembly mounted on an automotive vehicle to limit differential motion thereof as conditions require.

2. Description of the Prior Art

A limited-slip differential gear assembly provided with a single multidisk clutch for limiting differential operation is disclosed in U.S. Pat. No. 4,718,303 or U.S. Pat. No. 4,781,078. In each of these prior-art differential gear assemblies provided with a single multidisk clutch, the engagement force of the multidisk clutch is controlled by an electromagnet. That is, when the electromagnet is energized, friction force is generated between two contacting friction plates due to the differential motion to actuate a cam mechanism, so that the friction plates are further brought into tight contact with each other by a cam thrust to increase the friction force into the multidisk clutch engagement.

In this prior-art coupling apparatus, however, when the friction plates of the multidisk clutch wear away, since the air gap between the electromagnet and a plunger member varies and therefore the characteristics between magnet current value and clutch engagement force change, there exists a problem in that an appropriate differential limiting operation will not be controlled stably and reliably by the electromagnet. Further, where the thrust force is increased by changing the cam angle, since the clutch engagement force multiplied by the cam increases greatly with increasing frictional coefficient $\mu$ of the friction plates, as shown by the prior-art curve shown in FIG. 1(C), it is impossible to stably control a large differential limitation force by the cam. Therefore, where a large torque is required to be controlled, the diameter of the clutch inevitably increases and therefore the size of the coupling apparatus also increases.

SUMMARY OF THE INVENTION

With these problems in mind, therefore, it is the primary object of the present invention to provide a coupling apparatus with double clutches small in size and stable and large in coupling (or differential motion) limiting force, without being subjected to direct influence of the electromagnet attractive force and the cam angle.

To achieve the above-mentioned object, a coupling apparatus provided with double clutches, according to the present invention, comprises: (a) first rotating means (1029); (b) second rotating means (1033) disposed coaxially with said first rotating means; (c) main clutch means (1045) disposed between said first and second rotating means, for controllably transmitting a rotative motion between said first and second rotating means when controllably engaged; (d) cam ring means (1053) disposed coaxially with said first and second rotating means and said main clutch means, for controllably engaging only said main clutch means when axially slidably actuated; (e) pilot clutch means (1061) disposed between said cam ring means and any one of said first and second rotating means, for axially slidably actuating said cam ring means when controllably engaged; and (f) pilot clutch actuating means (1063) for controllably engaging said pilot clutch means to axially slidably actuating said cam ring means so that said main clutch means is controllably engaged. Further, in the second embodiment in which the coupling apparatus is incorporated with a planetary differential gear assembly as shown in FIG. 3, the coupling apparatus provided with double clutches, according to the present invention, comprises: (a) first rotating means (31); (b) second rotating means (47) differentially coupled to said first rotating means; (c) third rotating means (53) disposed coaxially with said second rotating means and differentially coupled to said first rotating means; (d) main clutch means (75) disposed between said first and third rotating means, for controllably transmitting a rotative motion between said first and third rotating means when controllably engaged; (e) cam ring means (79) disposed coaxially with said first, second and third rotating means and said main clutch means, for controllably engaging only said main clutch means when axially slidably actuated; (f) pilot clutch means (87) disposed between said cam ring means and said first rotating means, for axially slidably actuating said cam ring means when controllably engaged; and (g) pilot clutch actuating means (89) for controllably engaging said pilot clutch means to axially slidably actuating said cam ring means so that said main clutch means is controllably engaged. Further, the cam ring means (1053) comprises: (a) a first cam ring (1047) axially slidably fitted to any one of said first and second rotating means; and (b) a second cam ring (1049) fixedly fitted to any one of said first and second rotating means; when said pilot clutch means is engaged in a first direction, said first cam ring being axially shifted in a second direction opposite to the first direction by a cam thrust force generated between said first and second cam rings to engage said main clutch means.

The cam thrust force is generated between said first and second cam rings by a plurality of projections opposingly formed along each inner contact surface of said first and second cam rings so as to be engaged with each other or by a plurality of balls (78, 337, 409) sandwiched between two opposing recesses opposingly formed along each inner contact surface of said first and second cam rings so as to be engaged with each other via said balls.

Figure 5:
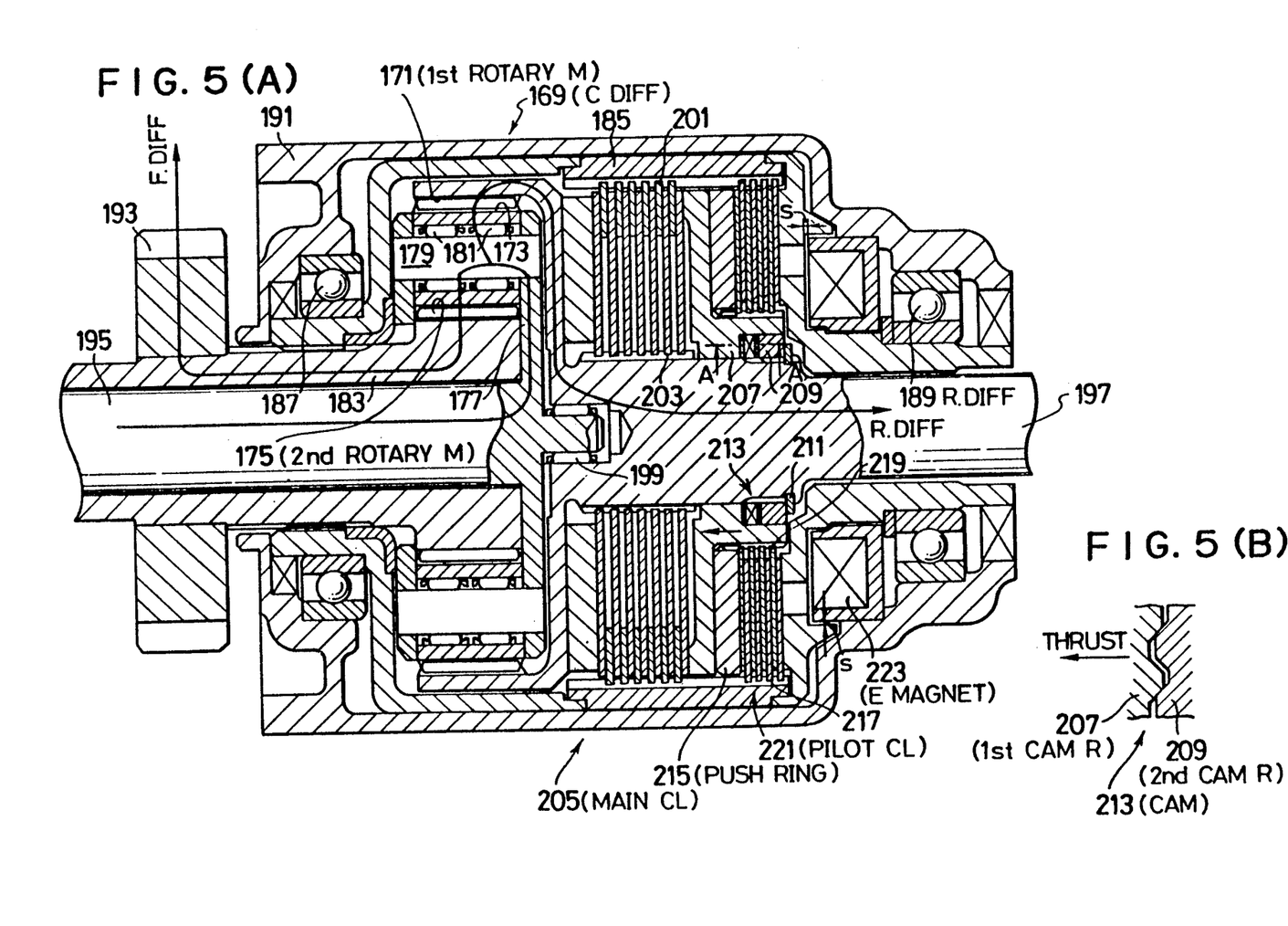
FIG. 5(A) a cross-sectional view showing a fourth embodiment of the coupling apparatus according to the present invention applied to a center differential gear assembly shown in FIG. 2, in which the basic embodiment shown in FIG. 1(A) is combined with a planetary-type differential gear assembly.
FIG. 5(B) is an enlarged partial cross-sectional view taken along the line A—A shown in FIG. 5(A)
Figure 6:
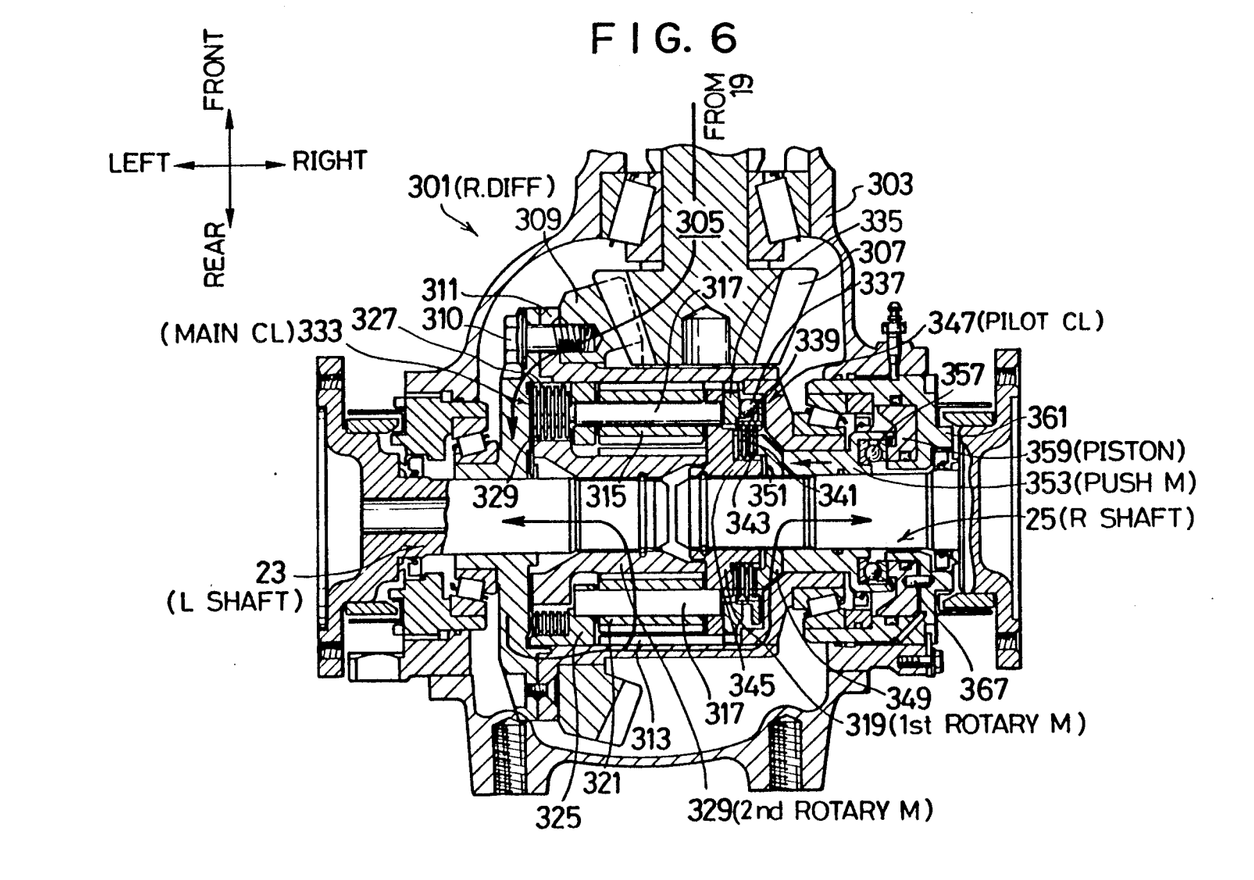
FIG. 6 is a cross-sectional view showing a fifth embodiment of the coupling apparatus according to the present invention applied to a rear differential gear assembly shown in FIG. 2.

In the third embodiment in which the coupling apparatus is incorporated with a planetary differential gear assembly housed within a transfer as shown in FIG. 4, said first rotating means is a planetary carrier (111) and said second rotating means is a sun gear shaft (109); and said pilot clutch means (157) is disposed between said cam ring means (151) and a planetary carrier (111) rotatable within a transfer case (119). In the fourth embodiment in which the coupling apparatus is incorporated with a planetary differential gear assembly housed within a transfer as shown in FIG. 5, said first rotating means is a differential case (171) and said second rotating means is a sun gear (175); and said pilot clutch means (217) is disposed between said cam ring means (213) and a rotary case (185) rotatable within a transfer case (191). In the fifth embodiment in which the coupling apparatus is incorporated with a rear differential gear assembly within a differential carrier as shown in FIG. 6, said first rotating means is a planetary carrier (319) and said second rotating means is a sun gear shaft (329); said pilot clutch means (347) is disposed between said cam ring means (339) and said planetary carrier (319) rotatable within a differential carrier case (303); and said cam ring menas for engaging said main clutch means (333) is engaged with a differential case (311). In the seventh embodiment in which the coupling apparatus is connected between a propeller shaft and a rear differential gear as shown in FIG. 8, said first rotary means is a coupling shaft (531) connected to the propeller shaft and said second rotating means is a drive pinion shaft (549) of the rear differential gear; and said pilot clutch means is disposed between said cam ring means (513) and a clutch drum (539) fixed to said coupling shaft (531).

The clutch actuating means is an electromagnet or an air piston. The pilot clutch means is a multidisk friction plate clutch or a magnetic fluid multidisk plate clutch. The main clutch means is a multidisk friction plate clutch.

In the coupling apparatus provided with two clutches according to the present invention, when the clutch actuating means is actuated, since the pilot clutch means is engaged, the cam ring means is actuated in such a way that a first slidable cam ring rotation is limited by the pilot clutch relative to a second fixed cam ring. Therefore, the first slidable cam ring is shifted by a cam thrust force generated between the two cam ring members to engage the main clutch, so that the two rotating means are coupled. Here, since the engagement torque of the pilot clutch is controlled by attractive force of the clutch actuating means, it is possible to controllably transmit torque between the two rotating means.

Therefore, when the coupling apparatus according to the present invention is incorporated in a differential gear assembly for automotive vehicles, it is possible to reliably limit or control differential motion of the gear assembly.

DESCRIPTION OF THE PREFERRED EMBODIMENTS

The coupling apparatus provided with double clutches according to the present invention will be described in further detail hereinbelow with reference to the attached drawings.

1st (Basic) Embodiment

Figure 1A:
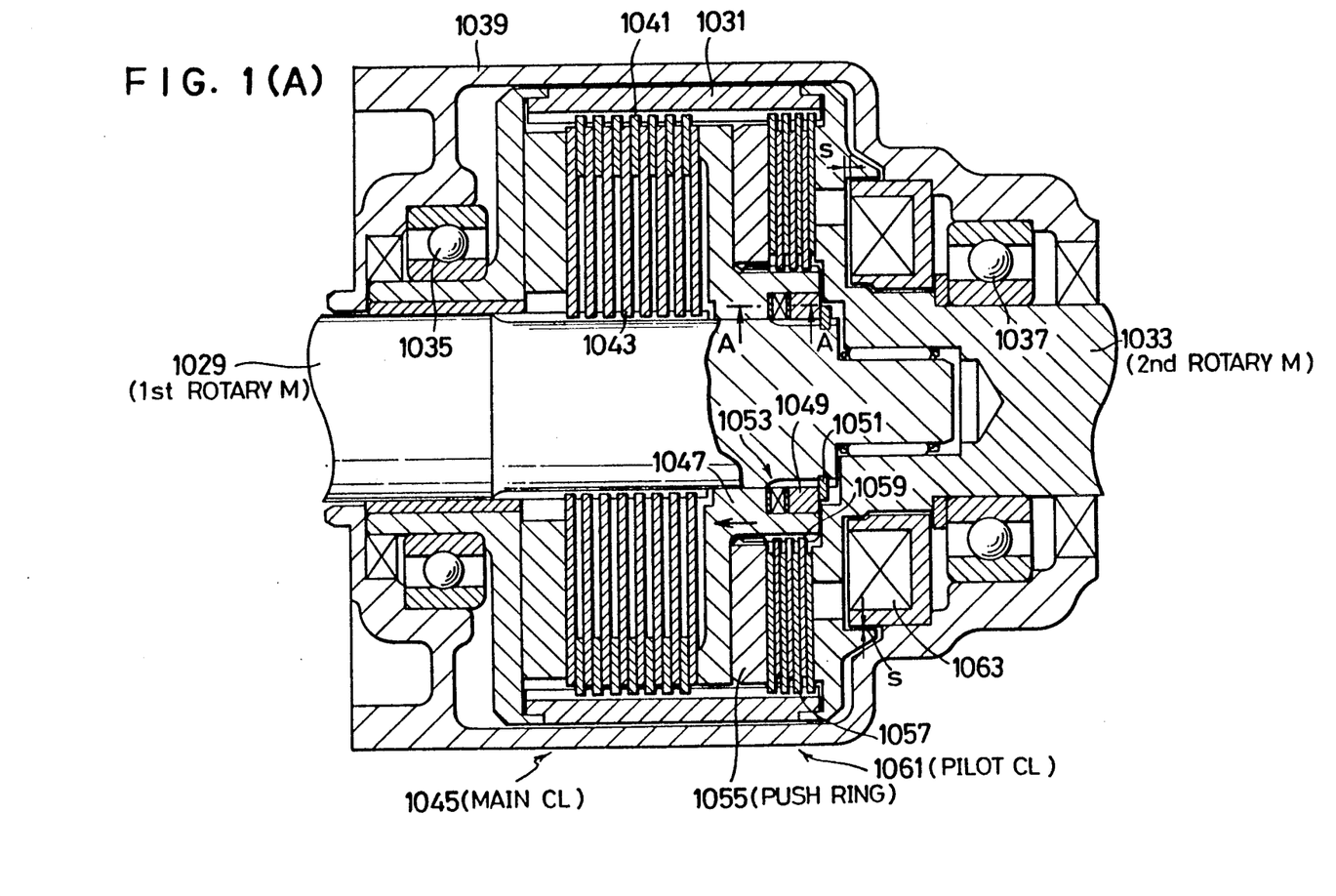
FIG. 1(A) is a cross sectional view showing a first (basic) embodiment of the coupling apparatus provided with double multidisk clutches according to the present invention.
Figure 1B:
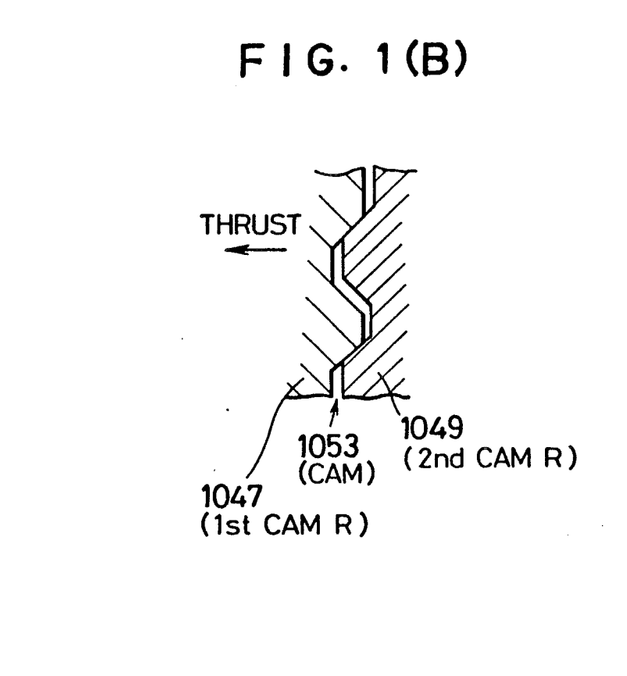
FIG. 1(B) is an enlarged partial cross-sectional view taken along the line A—A shown in FIG. 1(A), for assistance in explaining the cam mechanism of the coupling apparatus.

FIGS. 1(A) and (B) show a first (basic) embodiment of the coupling apparatus according to the present invention. The apparatus comprises roughly a first rotary member 1029, a second rotary member 1033, a pilot multidisk clutch 1061, a main multidisk clutch 1045, an electromagnet 1063, a push ring 1055 attracted by the electromagnet 1063 when energized, a cam mechanism 1053 formed between a first cam ring 1047 (axially slidable) and a second cam ring 1049 fixed to the first rotary member 1029, etc.

In more detail, the first rotary member (shaft) 1029 is rotatably supported within a clutch drum 1031. The drum 1031 is fixed to the second rotary member (shaft) 1033 supported coaxially with the shaft 1029 within a casing 1039 via bearings 1035 and 1037. A rotative power is supplied to the shaft 1029 and a load is connected to the shaft 1033.

Friction plates 1041 and 1043 of the main clutch 1045 are axially slidably arranged between the clutch drum 1031 and the shaft 1029 in alternate juxtapose positional relationship to each other. That is, the outer friction plates 1041 are axially slidably engaged with the drum 1031, and the inner friction plates 1043 are axially slidably engaged with the shaft 1029 so as to construct the main multidisk clutch 1045.

The first slidable cam ring 1047 is axially slidably fitted to the shaft 1029 on the right side of the main multidisk clutch 1045. Further, the second fixed cam ring 1049 is spline engaged with the shaft 1029 and fixed by a retainer ring 1051 from the right side. As shown in FIG. 1(A), the cam mechanism 1053 is formed between these two cam rings 1047 and 1049, in such a way that a cam thrust force is generated between the first and second cam rings 1047 and 1049 by a plurality of projections opposingly formed along each inner contact surface of the two cam rings so as to be engaged with each other.

The push ring 1055 is also axially slidably spline engaged with the first slidable cam ring 1047. On the right side of the push ring 1055, friction plates 1057 and 1059 are disposed in alternate juxtapose positional relationship to each other. That is, the outer friction plates 1057 are axially slidably engaged with the clutch drum 1031, and the inner friction plates 1059 are axially slidably engaged with the first slidable cam ring 1047 so as to construct the pilot multidisk clutch 1061. The electromagnet 1063 is fixed to the casing 1039 on the right side of the pilot multidisk clutch 1061. When the electromagnet 1063 is energized to attract to the push ring 1055, the pilot multidisk clutch 1061 is engaged.

In the basic operation of the coupling apparatus according to the present invention, when the electromagnet 1063 is deenergized, since the pilot clutch 1061 is disengaged or released, the main clutch 1045 is also kept disengaged or released, no power is transmitted from the first rotary member 1029 to the second rotary member 1033 or vice versa. However, when the electromagnet 1063 is energized, since the push ring 1055 is attracted toward the electromagnet 1063 to engage the pilot multidisk clutch 1061, the first slidable cam ring 1047 is engaged with the second rotary member 1033 via the pilot clutch 1061. On the other hand, since the second fixed cam ring 1049 is rotated by the first rotary member 1029, the first slidable cam ring 1047 is shifted leftward by a cam thrust force generated by the cam mechanism 1053 due to difference in rotative speed between the two cam rings in FIG. 1(A) to engage the main clutch 1045, so that the first and second rotary members 1029 and 1033 are coupled or locked with each other by the main clutch 1045.

Since the two pilot and main multidisk clutches 1061 and 1045 are provided, it is possible to obtain a large coupling power. Here, it should be noted that the two (horizontal and vertical) air gaps S between the electromagnet 1063 and the clutch drum 1031 will not vary even after the friction plates 1057 and 1059 of the pilot clutch 1061 have been worn away and that the leftward thrust force generated between the two cam rings 1047 and 1049 will not be applied to the pilot clutch 1061 or is opposite to the operative direction of the pilot clutch 1061. Further, it is possible to adjustably control the coupling torque between the two rotary members 1029 and 1033 by adjusting the current passed through the electromagnet 1063 to change the engagement torque of the pilot clutch 1061.

Vehicle Power System

Prior to the description of other embodiments of the coupling apparatus according to the present invention suitable for use with a differential gear assembly mounted on an automotive vehicle, an exemplary 4-WD power transmission system for an automotive vehicle will be explained with reference to FIG. 2. This power transmission system comprises an engine 1; a transmission 3, a center differential gear assembly (a differential gear between the front and rear wheels), a front differential gear assembly 7 (a differential gear between the front right and left wheels), front left and right wheel drive shafts 9 and 11, front left and right wheels 13 and 15, a 2–4 wheel drive switching gear assembly 17, a propeller shaft 19, a coupling apparatus 519, a rear differential gear assembly 521 (a differential gear between the rear right and left wheels), rear wheel drive shafts 23 and 25, rear left and right wheels 27 and 29, etc.

Therefore, engine power supplied via the transmission 3 is differentially distributed to the front differential gear assembly 7 and the propeller shaft 19 via the center differential gear assembly 5. Engine power supplied to the front differential gear assembly 7 is further differentially distributed to the front left and right wheels 13 and 15 via the same front gear assembly 7. Further, in 4-WD mode, engine power is supplied to the rear differential gear assembly 521 via the coupling apparatus 519. Engine power supplied to the rear differential gear assembly 521 is further differentially distributed to the rear left and right wheels 27 and 29 via the same rear gear assembly 521. Further, in front 2-WD mode, engine power is not supplied to the rear differential gear assembly 521 via the coupling apparatus 519.

2nd Embodiment

Figure 2:
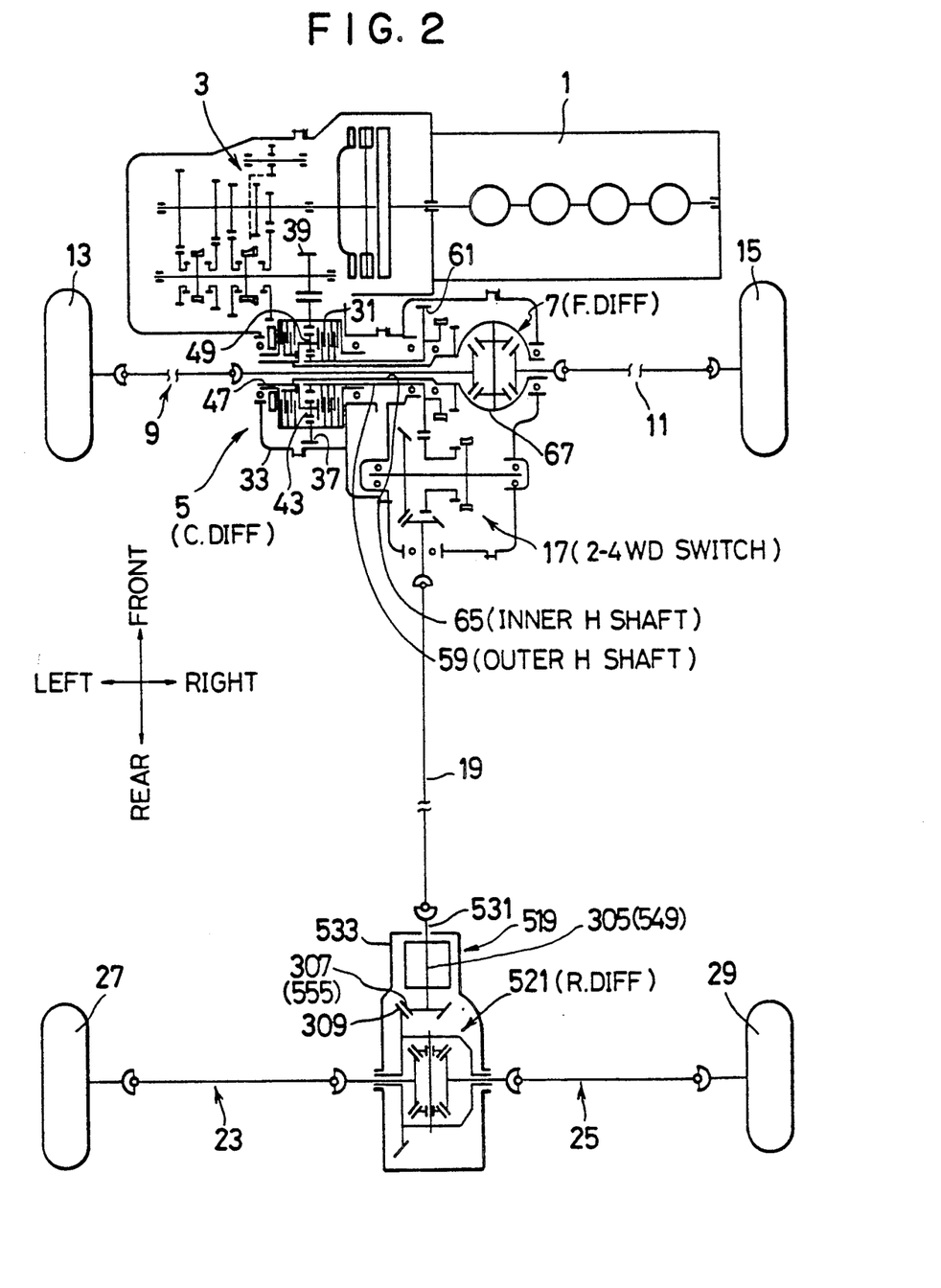
FIG. 2 is a skeleton diagram showing an exemplary engine power drive system of a 4-wheel drive vehicle, to which the coupling apparatus according to the present invention can be preferably applied.
Figure 3A:
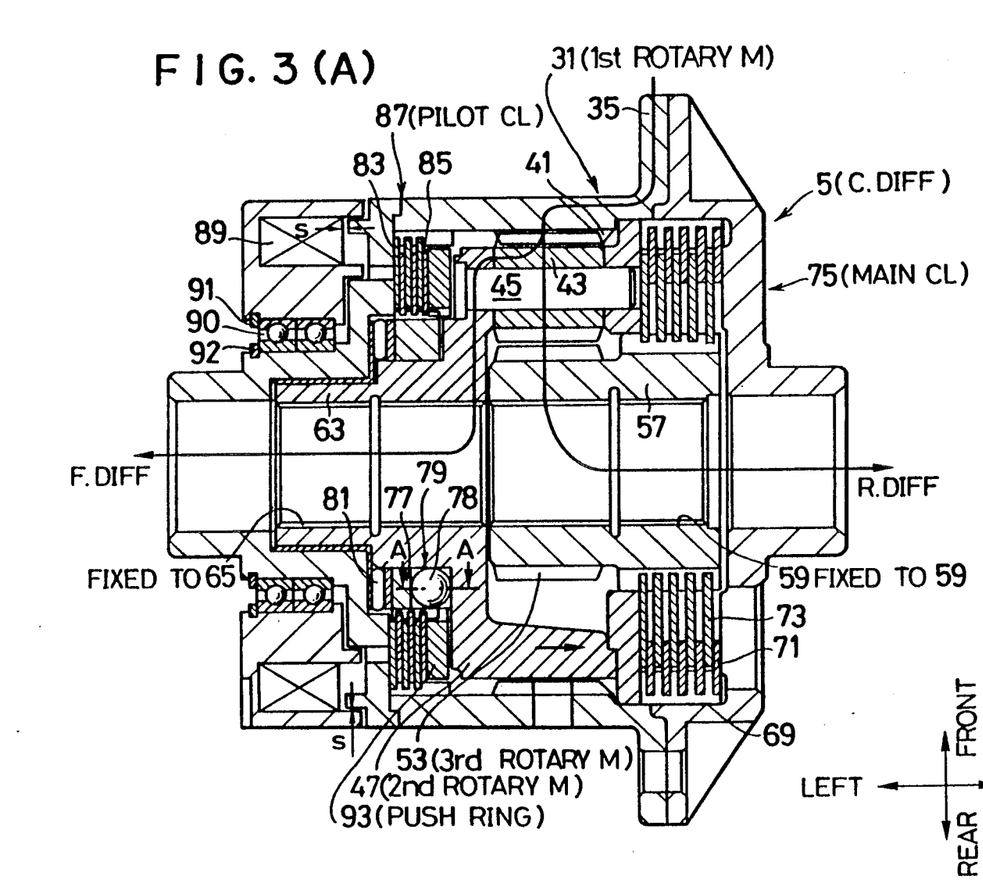
FIG. 3(A) is a cross-sectional view showing a second embodiment of the coupling apparatus according to the present invention applied to a center differential gear assembly shown in FIG. 2.
Figure 3B:
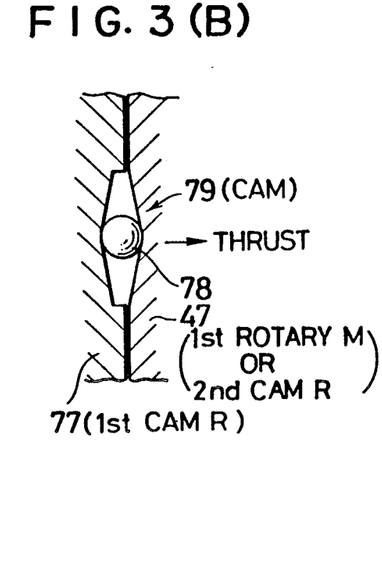
FIG. 3(B) is an enlarged partial cross-sectional view taken along the line A—A shown in FIG. 3(A)

FIGS. 3(A) and (B) show a second embodiment of the coupling apparatus according to the present invention, which is applied to the center differential gear 5 for differentially distributing engine power to the front and rear wheels. In this embodiment, the first rotary member is a differential case 31, the second rotary member is a slidable planetary carrier 47 and the third rotary member is a sun gear shaft 53. Further, a pilot clutch 87 is disposed between a cam mechanism 79 and a differential case 31. The slidable planetary carrier 47 is used in common with a part of the slidable cam ring for engaging a main clutch 75. The differential case 31 of the center differential gear 5 is disposed rotatably within a transmission case 33 (shown in FIG. 2). A ring gear 37 (shown in FIG. 2) is fixed to a flange 35 of the center gear 5 with bolts, and this ring gear 37 is in mesh with a drive gear 39 (shown in FIG. 2) of the transmission 3. Therefore, the differential case 31 is rotated by a drive power of the engine 1.

As shown in FIG. 3(A), an inner gear 41 is formed in the inner circumference of the differential case 31, and outer planetary gears 43 are in mesh with this inner gear 41. Each planetary gear 43 is rotatably supported by an axle 45 supported by the slidable planetary carrier 47 (the first rotary member). The planetary gears 43 are in mesh with inner planetary gears 49 (shown in FIG. 2) each rotatably supported by an axle fixed to the planetary carrier 47, and further in mesh with a sun gear 53 (the second rotary member). A planetary gear assembly (a differential mechanism) is constructed as described above.

The sun gear 53 is formed with a boss portion 57 whose inner circumference is spline engaged with one end of an outer hollow shaft 59 (shown in FIG. 2). The other end of the outer hollow shaft 59 is engaged with a change-direction gear assembly 17 via a ring gear 61 (both shown in FIG. 2). The planetary carrier 47 is formed with a boss portion 63 whose inner circumference is spline engaged with an inner hollow shaft 65 (shown in FIG. 2) rotatably inserted into the outer hollow shaft 59 (shown in FIG. 2) and fixed to a differential case 67 (shown in FIG. of the front differential gear assembly 7.

Therefore, when the differential case 31 is driven by the engine 1, the engine power is transmitted to the front differential gear assembly 7 via the differential case 31, the planetary gears 43 and 49, the planetary carrier 47, and the inner hollow shaft 65, and further to the propeller shaft 19 via the differential case 31, the planetary gears 3 and 49, the sun gear 53, the outer hollow shaft 59, and the 2–4 WD switch 17. In this case, if there exists a difference in driving resistance between the front and rear wheels, engine power is differentially distributed to the front wheels and the rear wheels, owing to the relative rotation between the sun gear 53 and the planetary carrier 47 due to revolutions of the two planetary gears 43 and 49 both round the sun gear 53 and their own axes, according to the driving resistance difference.

A clutch drum 69 is disposed on the right side of the planetary gear assembly so as to be rotatable relative to the differential case 31. This clutch drum 69 is fixed to the right end of the planetary carrier 47. Outer friction plates 71 are axially slidably engaged with the inner circumferential surface of the clutch drum 69, and inner friction plates 73 are axially slidably engaged with the outer circumferential surface of the boss portion 57 of the sun gear 53 in alternate juxtapose positional relationship with respect to the friction plates 71, so that a main multidisk clutch 75 for differential motion limitation can be constructed.

Once the main multidisk clutch 75 is engaged, since the mutual rotation between the sun gear 53 and the planetary carrier 47 can be limited, the differential motion between the front and rear wheels can be also limited.

A cam ring 77 is disposed on the left side of the planetary carrier 47, and the cam mechanism 79 is formed between the cam ring 77 and the planetary carrier 47 (the first slidable cam ring), as shown in FIG. 3(B), with cam balls 78 sandwiched therebetween. Further, a thrust bearing 81 is disposed between the cam ring 77 and the differential case 31 so as to receive a leftward reaction force of the thrust of the cam ring 77.

Outer friction plates 83 and inner friction plates 85 are disposed between the cam ring 77 and the differential case 31 in alternate juxtapose positional relationship with respect to each other. The outer friction plates 83 are axially slidably engaged with an inner circumference of the differential case 31, and the inner friction plates 85 are axially slidably engaged with an outer circumference of the cam ring 77, so that a pilot multidisk clutch 87 can be constructed. On the outside of the differential case 31, an electromagnet 89 is mounted via a bearing 90 with two retainer rings 91 and 92. A push ring 93 for engaging the pilot multidisk clutch 87 is disposed between the pilot multidisk clutch 87 and the planetary carrier 47 so as to be attracted by the electromagnet 89, thus an electromagnetic pilot multidisk clutch 87 can be constructed. In this case, it should be noted that two horizontal and vertical air gaps S between the electromagnet 89 and the differential case 31 will not change when the friction plates 83 and 85 have been worn away. In summary, the coupling apparatus of the present invention is composed of the main multidisk clutch 75, the cam ring 77, the cam balls 78, the electromagnetic pilot multidisk clutch 87, and the two rotary members (planetary carrier and sun gear) 47 and 53.

When the pilot electromagnet multidisk clutch 87 is engaged, since the fixed cam ring 77 is engaged with the planetary carrier 47 via the cam mechanism 79, it is possible to obtain differential limitation according to the engagement force of the pilot multidisk clutch 87. Further, where there exists a difference in rotative force between the differential case 31 and the planetary carrier 47, since this force is applied to the cam mechanism 79, a leftward thrust force is generated, so that the main multidisk clutch 75 is engaged via the planetary carrier 47 and the clutch drum 69 by this thrust force, to generate a further larger differential motion limiting force. When the pilot electromagnetic multidisk clutch 87 is deenergized, since the cam ring 77 rotates together with the planetary carrier 47, the cam mechanism 79 will not generate a thrust force, so that the main multidisk clutch 75 is kept disengaged to enable the differential motion.

In summary, when the pilot clutch 87 is disengaged, the planetary carrier (1st rotary member) 47 and the cam ring 77 are rotated together via the cam balls 78. Since no rightward thrust force is generated in the planetary carrier 47, the main clutch 75 is also disengaged, so that the differential motion between the two rotary members 47 and 53 is enabled. However, when the pilot clutch 87 is engaged, since the rotational motion of the cam ring 77 is restricted, the rotative motion of the planetary carrier 47 is also limited according to the engagement force of the pilot clutch 87. In addition, once the differential motion occurs between the cam ring 77 and the planetary carrier 47, since a rightward thrust force is generated in the planetary carrier 47, the main clutch 75 is also engaged, so that the differential motion between the two rotary members 47 and 53 is limited or locked.

The electromagnetic pilot multidisk clutch 87 can be operated manually by the driver or automatically according to steering conditions or road surface conditions. The center differential 5 is constructed as described above.

The function of the center differential gear 5 will be explained in relation to the vehicle power transmission system shown in FIG. 2.

When the electromagnetic pilot multidisk clutch 87 is deenergized or disengaged, the differential motion between the front and rear wheels can be effected freely through the center differential gear 5. Therefore, the vehicle can be turned smoothly without producing the tight corner braking phenomenon. When the electromagnetic pilot multidisk clutch 87 is energized or engaged, the differential motion between the front and rear wheels can be limited according to a difference in rotative speed between the front and rear wheels. Therefore, in case the front wheels 13 and 15 or the rear wheels 27 and 29 slip on a slippery road, since a torque can be transmitted to the front or rear wheels not being slipping, the vehicle can be get out of a slippery road without being kept in stack condition.

Figure 1C:
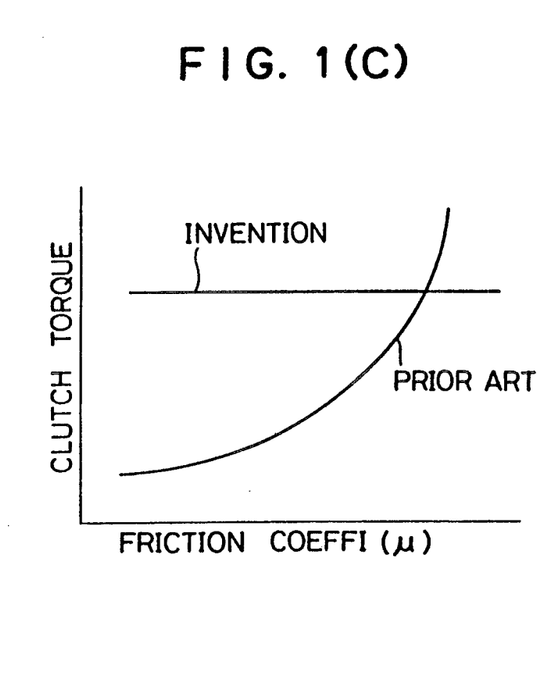
FIG. 1(C) is a graphical representation showing the relationship between the friction coefficient ($\mu$) between two clutch plates and the clutch engagement torque, in comparison between the invention apparatus and the prior-art apparatus.

As described above, in the coupling apparatus according to the present invention, when the electromagnetic pilot multidisk clutch 87 is engaged, the cam mechanism 79 is actuated and therefore the main multidisk clutch 75 can be engaged by the rightward thrust force of the planetary carrier (the slidable cam ring) 47. In this embodiment, since the shift directions of the two clutches 87 and 75 are opposite to each other, a cam reaction force is not applied to the electromagnetic pilot multidisk clutch 87. Therefore, the clutch engagement force of the main multidisk clutch 75 is not directly subjected to the influence of variation in engagement force due to abrasion or friction coefficient fluctuation of the friction plates 83 and 85 of the electromagnetic pilot multidisk clutch 87. Therefore, it is possible to obtain a stable or constant differential motion limitation function, as shown in FIG. 1(C), without being subjected to the influence of the conditions of the friction plates of the pilot clutch 87. Further, since two independent differential motion limitation functions are provided for both the pilot and main multidisk clutches 87 and 75, respectively, it is possible to obtain a large differential motion limitation force in total. Further, since the reaction thrust force of the cam 79 will not be applied to the friction plates 83 and 85 of the electromagnetic pilot multidisk clutch 87, fluctuations of the friction coefficients μ of the friction plates 83 and 85 will not be amplified by the cam mechanism 79. Therefore, it is possible to increase the engagement force of the main clutch 75 by increasing inclination angles of the cam mechanism 79 without being subjected to the influence of variation in the friction coefficient of the friction plates 83 and 85. Therefore, a large torque can be transmitted and the coupling apparatus can be downsized. Further, in this embodiment, since the planetary carrier 47 is used in common with the second slidable ring member for engaging the main multidisk clutch 75, it is unnecessary to provide an additional ring member, thus reducing the weight thereof.

3rd Embodiment

Figures 4A, 4B:
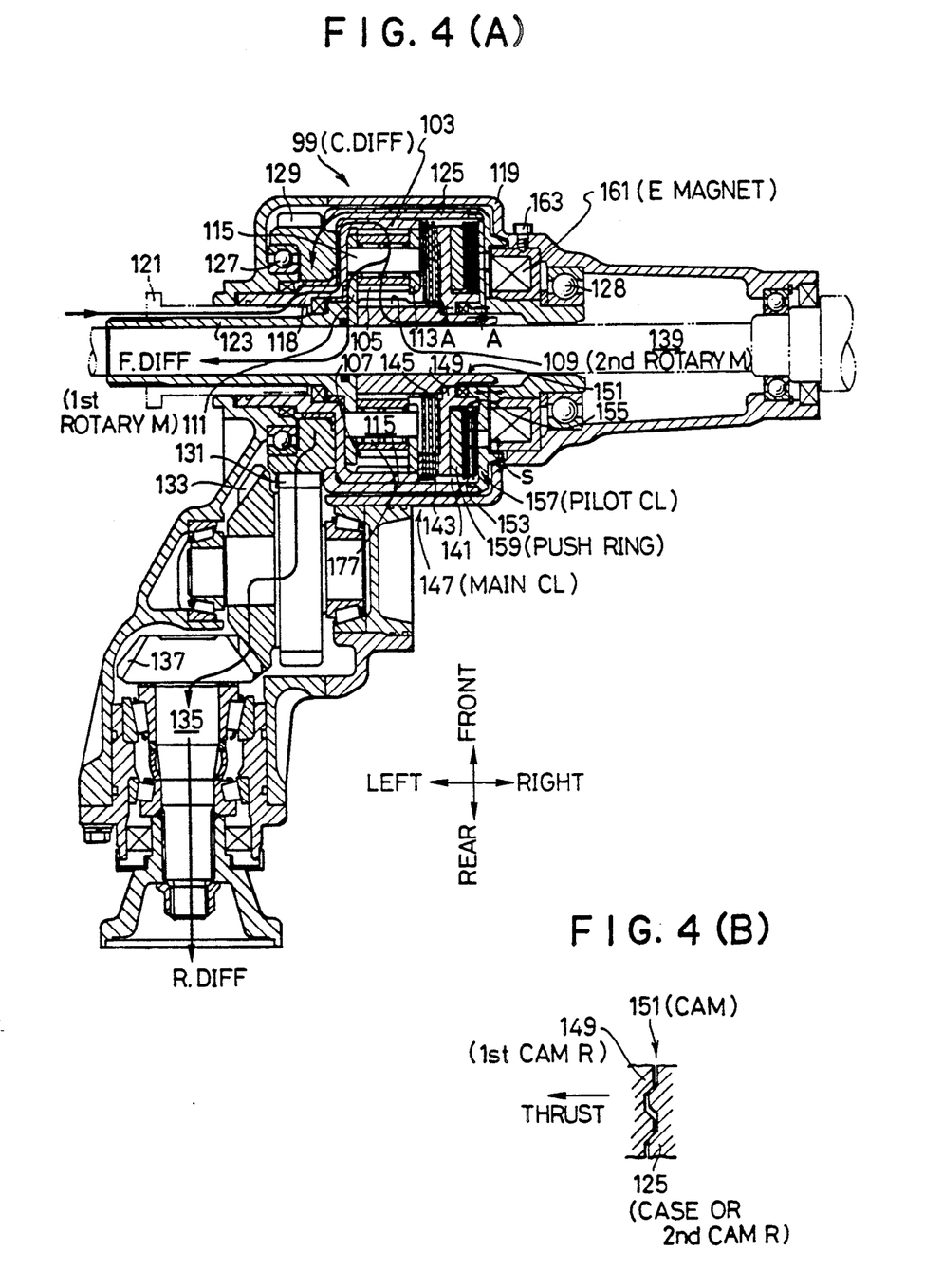
FIG. 4(A) is a cross-sectional view showing a third embodiment of the coupling apparatus applied to a transfer including a center differential gear assembly.
FIG. 4(B) is an enlarged partial cross-sectional view taken along the line A—A shown in FIG. 4(A)

FIGS. 4(A) and (B) show a third embodiment of the coupling apparatus according to the present invention, which is applied to the center differential gear assembly housed within a transfer, for differentially distributing engine power to the front and the rear differential gear assemblies. In this embodiment, the first rotary member is a planetary carrier 111 or 113 and the second rotary member is a sun gear 109. A pilot clutch 157 is disposed between a cam mechanism 151 and a planetary carrier 111 rotatable within a transfer case 119.

The center differential gear assembly 99 comprises an inner gear 103, outer planetary gears 105 in mesh with the inner gear 103, inner planetary gears 107 in mesh with the outer planetary gears 105, and a sun gear 109 (a second rotary member) in mesh with the inner planetary gears 107. These planetary gears 105 and 107 are supported by axles 115 supported by right and left planetary carriers 111 and 113 via bearings 117, respectively.

A hollow member 118 formed with the inner gear 103 is spline engaged with an outer hollow shaft 121 inserted into the inside of a transfer case 119 from left. The left side carrier 111 is formed integral with an inner hollow shaft 123 inserted into the outer hollow shaft 121. Further, the sun gear 109 is spline coupled to the right end of a rotary case 125 (in which the center differential gear assembly 99 is housed) and rotatably supported within the transfer case 119 via bearings 127 and 128. A gear 129 is fixed to the left end of the rotary case 125 so as to be in mesh a gear 131 rotatably supported by the transfer case 119. A bevel gear 133 is fixed to this gear 131 and in mesh with a bevel gear 137 formed at the front end of a drive pinion shaft 135. Further, a front right wheel drive shaft 139 is fitted to the hollow shaft 123, the sun gear 109, and the rotary case 125.

An engine drive power is transmitted from the transmission to the front differential gear by way of the outer hollow shaft 121, the hollow member 118, the inner gear 103, the outer planetary gear 105 or the inner planetary gear 107, the axle 115, the planetary carrier 111, and the inner hollow shaft 123. Further, the engine drive power is transmitted to the rear differential gear by way of the outer hollow shaft 121, the hollow member 118, the inner gear 103, the outer planetary gear 105, the inner planetary gear 107, the sun gear 109, the rotary case 125, the bevel gears 133 and 137, and the drive pinion shaft 135.

A clutch drum 141 is fixed to the right side planetary carrier 113, but formed separately from the inner gear 103 (the first rotary member). Outer and inner friction plates 143 and 145 of a main multidisk clutch 147 are axially slidably arranged between the clutch drum 141 and the sun gear 109 in alternate juxtapose positional relationship with respect to each other. That is, the outer friction plates 143 are axially slidably engaged with the clutch drum 141, and the inner friction plates 145 are axially slidably engaged with the sun gear 109 so as to construct the main multidisk clutch 147. A slidable cam ring 149 is slidably disposed on the right side of the main multidisk clutch 147, and a cam mechanism 151 is formed between the two inside surfaces of the slidable cam ring 149 and the rotary case 125 (the second fixed cam ring), as depicted in FIG. 4(B).

Outer friction plates 153 and inner friction plates 155 of a pilot multidisk clutch 157 are axially slidably arranged between the cam ring 149 and the clutch drum 141 in alternate juxtapose positional relationship to each other. That is, the outer friction plates 153 are axially slidably engaged with the clutch drum 141 and the inner friction plates 155 are axially slidably engaged with the cam ring 149 so as to construct the pilot multidisk clutch 157. A push ring 159 is axially slidably spline-engaged with the slidable cam ring 149 between these friction plates 153 and 155 and the slidable cam ring 149. An electromagnet 161 is fixed to a transfer case 119 with bolts 163 on the right side of the pilot multidisk clutch 157.

The operation of this third embodiment is substantially the same as that of the first embodiment shown in FIGS. 1(A) and (B). That is, when the electromagnet 161 is deenergized, since the pilot clutch 157 is disengaged, the slidable cam ring 149 rotates together with the sun gear 109 (the second rotary member) formed integral with the rotary case 125 via the cam mechanism 151, so that the differential motion between the planetary carrier 111 or 113 (the inner gear 103) or the inner hollow shaft 123 connected to the front differential gear and the sun gear 109 or the rotary case 125 connected to the rear differential gear is enabled.

However, when the electromagnet 161 is energized, since the push ring 159 is attracted in the rightward direction, the pilot clutch 157 is engaged, so that the differential motion between the planetary carrier 111 or 113 and the rotary case 125 is limited via the cam mechanism 151. In addition, since the slidable cam ring 149 is engaged with the rotary case 125 via the cam mechanism 151 and further the rotary case 125 is rotated by the planetary carrier 111 or 113, the slidable cam ring 149 is shifted by a cam thrust force in the leftward direction in FIG. 4(A) to engage the main clutch 147, so that the differential motion between the inner gear 103 (the first rotary member) and the sun gear 109 (the second rotary member) is slip limited or locked according to the engagement force of the main clutch 147.

In this embodiment, it should be noted that the rotary case 125 is used in common as a second fixed cam ring and the two air gaps S between the electromagnet 161 and the rotary case 125 will not vary even after the friction plates 151 and 153 have been worn away.

4th Embodiment

FIGS. 5(A) and (B) show a fourth embodiment of the coupling apparatus according to the present invention, in which the first embodiment shown in FIG. 1(A) is combined with a planetary gear type center differential gear assembly. In this embodiment, the first rotary member is a differential case 171 and the second rotary member is a sun gear 175. A pilot clutch 221 is disposed between a slidable cam ring 207 and a rotary case 185 rotatable within a transfer case 191.

A center differential gear 169 comprises an inner gear 171 (the first rotary member), a planetary gear 173 in mesh with the inner gear 171, and a sun gear 175 (the second rotary member) in mesh with the planetary gear 173. The planetary gear 173 is rotatably supported by axles 179 supported by a planetary carrier 177 via bearings 181.

A hollow shaft 183 formed with the sun gear 175 is spline-engaged with a rotary case 185 in which the center differential gear assembly 169 is housed. This rotary case 185 is rotatably supported within the transfer case 191 via bearings 187 and 189. A gear 193 is fixed to the hollow shaft 183 on the left outside of the transfer case 191. The planetary carrier 177 is formed integral with a shaft 195 rotatably inserted into the hollow shaft 183. A shaft 197 is disposed coaxially with the shaft 195 and rotatably inserted into the two cases 185 and 191 from the right, and fixed to the inner gear 171. These two shafts 195 and 197 are supported by each other via a bearing 199.

An engine power is transmitted from the shaft 195 to the planetary carrier 177 of the center differential gear assembly 169, and then distributed from the sun gear 175 to the front differential gear assembly via the gear 193 and from the inner gear 171 to the rear differential gear assembly via the shaft 197.

Outer and inner friction plates 201 and 203 of a main clutch 205 are axially slidably arranged between the rotary case 185 and the shaft 197 in alternate juxtapose positional relationship to each other. That is, the outer friction plates 201 are axially slidably engaged with the rotary case 185 and the inner friction plates 203 are axially slidably engaged with the shaft 197 so as to construct the main multidisk clutch 205.

A first slidable cam ring 207 is disposed on the right side of the main multidisk clutch 205. Further, a second fixed cam ring 209 is spline coupled to the shaft 197 and fixed by a retainer ring 211 from the right side thereof. As shown in FIG. 5(B), a cam mechanism 213 is formed between the first slidable cam ring 207 and the second fixed cam ring 209.

A push ring 215 is axially slidably spline coupled to the first slidable cam ring 207. On the right side of the push ring 215, outer and inner friction plates 217 and 219 of a pilot clutch 225 are axially slidably disposed between the rotary case 185 and the first slidable cam ring 207 in alternate juxtapose positional relationship to each other. That is, the outer friction plates 217 are axially slidably engaged with the rotary case 185 and the inner friction plates 219 are axially slidably engaged with the first slidable cam ring 207 so as to construct the pilot multidisk clutch 221. An electromagnet 223 is fixed to the transfer case 191 on the right side of the pilot multidisk clutch 221.

The fourth embodiment of the coupling apparatus is operated in quite the same way as that of the first embodiment shown in FIG. 1(A). That is, when the electromagnet 223 is deenergized, since both the clutches 221 and 205 are disengaged, a rotative power is differentially distributed to the hollow shaft 183 (the second rotary member) and the shaft 197 (the first rotary member) via the inner gear 171, the planetary gear 173 and the sun gear 175. However, when the electromagnet 223 is energized, since the push ring 215 is attracted toward the electromagnet 223 to engage the pilot multidisk clutch 221, the first slidable cam ring 207 is engaged with the rotary case 185 (the second rotary member). On the other hand, since the second fixed cam ring 209 is rotated by the shaft 197 (the first rotary member), the first slidable cam ring 207 is shifted leftward by a cam thrust force generated by the cam mechanism 213 as shown in FIG. 5(B) to engage the main clutch 205, so that the two shafts 197 and 183 (the first and second rotary members) are coupled or locked with each other to limit the differential motion of the center differential gear assembly.

Further, the two air gaps S between the electromagnet 223 and the rotary case 185 will not vary even after the friction plates 217 and 219 have been worn away.

5th Embodiment

FIG. 6 shows a fifth embodiment of the coupling apparatus according to the present invention, which is applied to a rear differential gear assembly 301. In this embodiment, the first rotary member is a planetary carrier 319 and the second rotary member is a sun gear shaft 329. A pilot clutch 347 is disposed between a cam ring 339 and the planetary carrier 319 rotatable within a differential carrier case 303. Further, the cam ring 339 for engaging the main clutch 333 is engaged with a differential case 311.

As shown in FIG. 6, one end of a drive pinion shaft 305 is inserted into a rear differential carrier 303. A vehicle front end of the drive pinion shaft 305 is connected to a connection shaft 531 connected to a propeller shaft 19 (as shown in FIG. 2) and rotated by engine power. A drive pinion gear 307 is fixed to an end of the drive pinion shaft 305 inserted into the differential carrier 303, and in mesh with a ring gear 309.

This ring gear 309 is fixed to a differential case 311 with bolts 310 and rotatably supported within the rear differential carrier 303. This differential case 311 is formed with an inner gear 313 on the inner surface thereof. The inner gear 313 is in mesh with outer planetary gears 315 rotatably supported by shafts 317 supported by the planetary carrier 319 (the first rotary member). The outer planetary gears 315 are in mesh with inner planetary gears 321 rotatably supported by axles 317 also supported by the planetary carrier 319. Further, the inner planetary gears 321 are in mesh with a sun gear 329 (the second rotary member). A planetary gear assembly of the differential gear is thus constructed.

The sun gear 329 is spline coupled with an inner circumference of a rear left wheel drive shaft 23. The planetary carrier 319 is spline coupled with an inner circumference of a rear right wheel drive shaft 25.

Therefore, when the differential case 311 is rotated by engine power, the power can be transmitted from the planetary carrier 319 to the rear right wheel drive shaft 25 and from the sun gear 323 to the rear left wheel drive shaft 23 through the planetary gear assembly. In this case, when there exists a difference in driving resistance between the left and right wheels, the engine power is differentially distributed to the right and left wheels according to the driving resistance difference between the two, owing to the mutual revolution between the sum gear 329 and the planetary carrier 319 based upon the revolutions of the two outer and inner planetary gears 315 and 321 both round the sun gear 329 and their own axes.

A clutch drum 325 (the slidable cam ring 335) is rotatably disposed on the left side of the planetary gear assembly so as to be rotatable relative to the differential case 311. This clutch drum 325 is formed integral with the planetary carrier 319 and the axle 317. A main multidisk clutch 333 for limiting differential motion is composed of outer friction plates 327 axially slidably engaged with an inner circumference of the clutch drum 325, and inner friction plates 329 axially slidably engaged with an outer circumference of a boss portion of the sun gear 329 in alternate juxtapose positional relationship with respect to the friction plates 327. When the main multidisk clutch 333 is engaged, the relative rotation between the sun gear 329 and the planetary carrier 319 can be limited, so that the differential motion between the rear right and left wheels can be limited.

The first slidable cam ring 335 is disposed on the right side of the planetary carrier 319 and axially slidably engaged with the inner gear 313 of the differential case 311. On the right side of the slidable cam ring 335, a second fixed cam ring 339 is disposed so that the axial position thereof is determined by the differential case 311 via a thrust washer and the radial position thereof is determined by the differential case 311 via the slidable cam ring 335. Outer and inner friction plates 341 and 343 are disposed between a boss portion 345 of the planetary carrier 319 and the second slidable cam ring 335. The outer friction plates 341 are axially slidably engaged with an inner circumference of the second slidable cam ring 339, and the inner friction plates 343 are axially slidably engaged with an outer circumference of a boss portion 345 of the planetary carrier 319 in alternate juxtapose positional relationship with respect to each other, so as to construct a pilot multidisk clutch 347.

On the right side of the pilot multidisk clutch 347, a pressure member 349 is spline engaged with the wheel shaft 25, and urged rightward by a return spring 351 disposed between the pressure member 349 and the boss portion 345 of the planetary carrier 319.

A push member 353 spline engaged with the wheel drive shaft 25 is brought into contact with the axially outside end of the pressure member 349 and further with a piston 359 disposed within a cylinder 361 via a bearing 357. Sealing members are airtightly disposed between the piston 359 and the cylinder 361 so as to form an air working chamber 367.

When the compression air is supplied to the working chamber 367, the piston 359 is moved in the leftward direction in FIG. 6. Since the push member 353 is also moved in the leftward direction, the pilot multidisk clutch 347 is engaged, so that a thrust force is generated in the first slidable cam ring 335 to move the clutch drum 325 in the leftward direction via the planetary carrier 319. As a result, the main multidisk clutch 333 can be engaged. Therefore, the differential mention between the planetary carrier 319 (the first rotary member) and the sun gear 329 (the second rotary member) is locked by the main clutch 333. Further, in FIG. 6, the return spring ring 351 returns the push member 353 in the rightward direction when the piston 359 is released.

When one of the right and left wheels is stuck on an icy or slippery road, since the road resistance of the slipping wheel is small and that of the non-slipping wheel is large, a differential gear operates to decrease the rotative speed of the non-slipping wheel and to increase the rotative speed of the slipping wheel. Therefore, the slipping wheel rotates at a higher rotative speed, and therefore the vehicle will not be driven out of the slippery road. Under these conditions, the main multidisk clutch 333 is actuated into engagement to forcedly increase the resistance or the friction between the slipping wheel and the wheel drive shaft, so that the vehicle can be driven out of the slippery road.

As described above, in the fifth embodiment, when the pilot multidisk clutch 347 is actuated by a compression air, since the main multidisk clutch 333 is engaged by the slidable cam ring 335, it is possible to stably control a large differential motion limiting power and to minimize the apparatus size. Further, since the thrust reaction force of the cam ring 335 will not be applied to the pilot multidisk clutch 347, it is possible to control a large torque by a small torque resistance.

6th Embodiment

Figure 7:
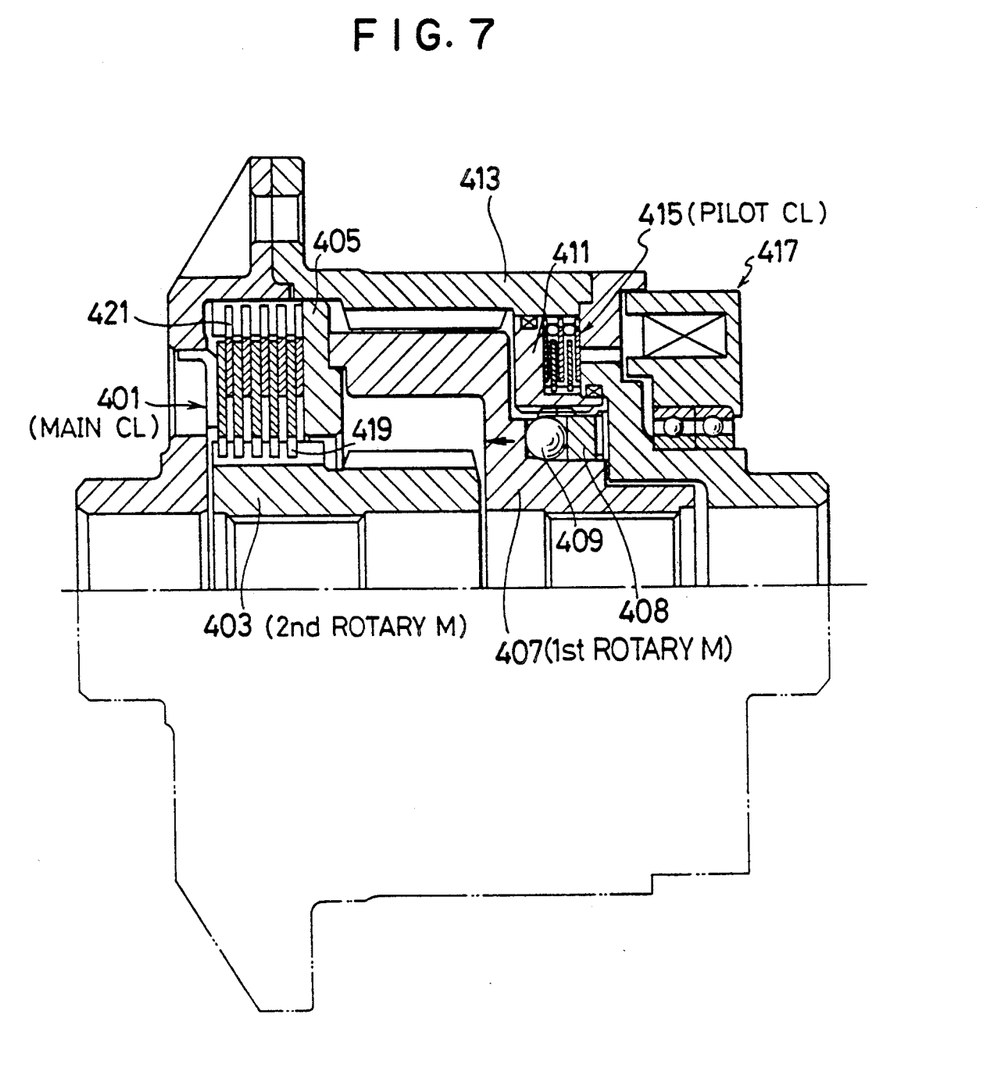
FIG. 7 is a cross-sectional view showing a sixth embodiment of the coupling apparatus according to the present invention applied to a planetary differential gear assembly, in which an electromagnetic fluid is charged into a working chamber of a pilot clutch.

FIG. 7 shows a sixth embodiment of the coupling apparatus according to the present invention, in which an magnetic fluid is adopted as the pilot multidisk clutch. In this embodiment, the first rotary member is a planetary carrier 407, and the second rotary member is a sun gear shaft 403. A pilot clutch 415 is disposed between a second fixed cam ring 408 and the differential case 413.

The coupling apparatus comprises a differential case 413 (the first rotary member) formed with an inner gear, a sun gear 403 (the second rotary member), a pilot magnetic fluid clutch 415, a main multidisk clutch 401, a cam mechanism having a first slidable cam ring 407 (a planetary carrier having planetary gears), a second fixed cam ring 408 and balls 409, and an electromagnet 417. The differential gear is composed of an inner gear formed on the inner surface of the differential case 413, outer planetary gears in mesh with the inner gear, inner planetary gears in mesh with the outer planetary gears, and the sun gears in mesh with the inner planetary gears, as shown in FIGS. 3 and 6. Further, the power transmission route is the same as in FIG. 4(A).

Inner friction plates 419 of the main multidisk clutch 401 are axially slidably engaged with the sun gear 403, and outer friction plates 421 of the main multidisk clutch 401 are axially slidably engaged with a clutch drum 405. The clutch drum 405 is fixed to the planetary carrier 407 coupled to the second fixed cam ring 408 via cam balls 409. A working chamber 415 filled with a magnetic fluid is formed between a housing 411 and the differential case 413.

The electromagnet 417 is arranged on the outside of the differential case 413 so as to generate magnetic flux to be passed through the working chamber 415. Since the viscous resistance of the magnetic fluid changes according to the intensity of the magnetic flux passing through the magnetic fluid, it is possible to control the rotative speed of the second slidable cam ring 407 spline engaged with the housing 411. As a result, the cam mechanism is actuated to move the first slidable cam ring 407 in the leftward direction in FIG. 7, and therefore the main multidisk clutch 401 is engaged to limit or lock the differential motion between the two rotary members 407 and 413.

7th Embodiment

Figures 8A, 8B:
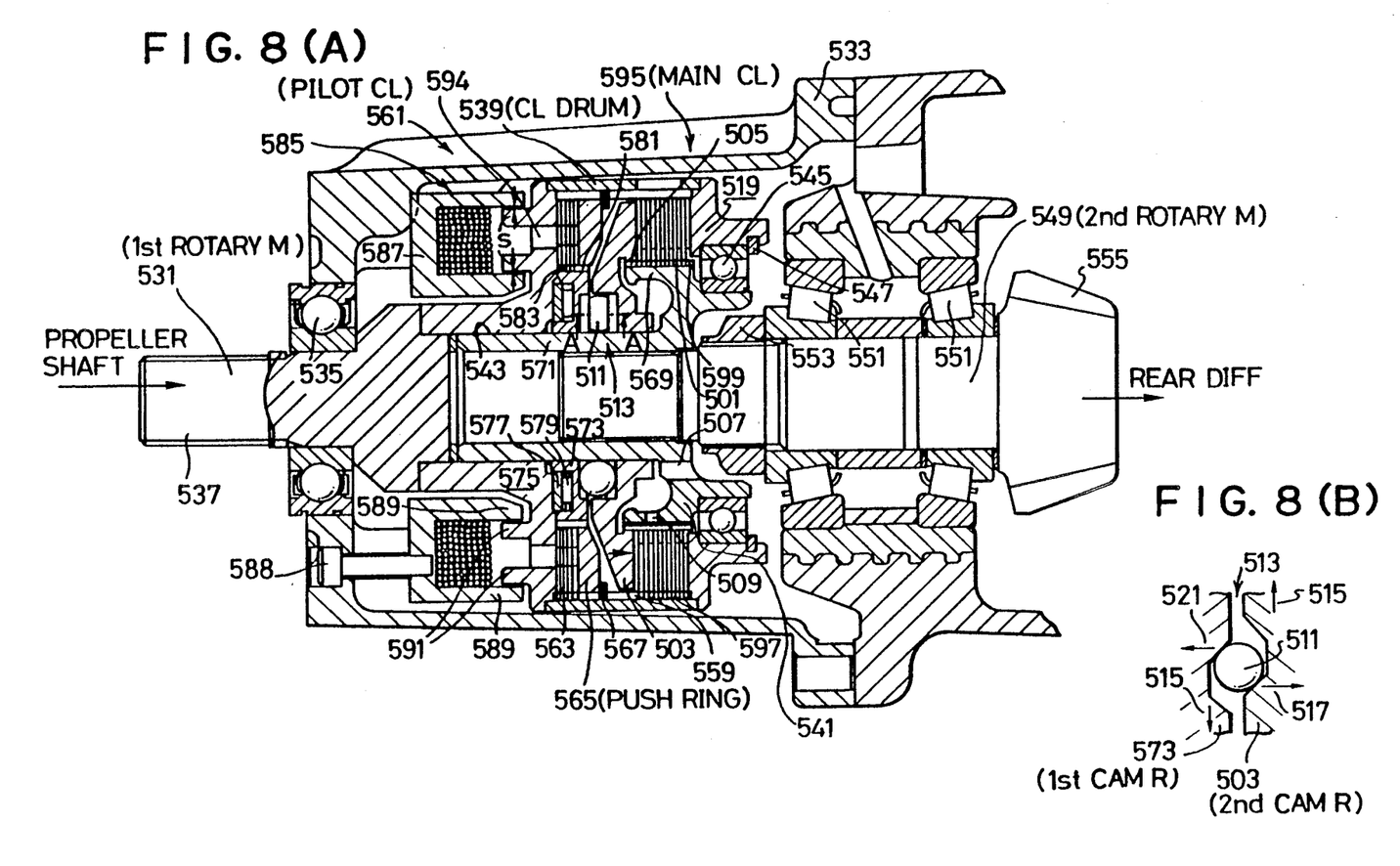
FIG. 8(A) is a cross-sectional view showing a seventh embodiment of the coupling apparatus according to the present invention connected between the propeller shaft and the rear differential gear assembly shown in FIG. 2.
FIG. 8(B) is an enlarged partial cross-sectional view taken along the line A—A shown in FIG. 8(A).

FIGS. 8(A) and (B) show a seventh embodiment of the coupling apparatus according to the present invention, which is applied to an apparatus connected between a propeller shaft 19 and a rear differential gear assembly 521. In this embodiment, the first rotary member is a coupling shaft 531 connected to the propeller shaft and the second rotary member is a drive pinion shaft 549 of the rear differential gear assembly. A pilot clutch is disposed between a cam mechanism 513 and a clutch drum 539 fixed to the coupling shaft 531.

The coupling shaft 531 (a first rotary member) is disposed passing through a carrier 533 of the rear differential gear assembly 521 supported by the carrier 533 via a bearing 535, and further coupled to a propeller shaft 19 (shown in FIG. 2) via a spline portion 537. Therefore, the shaft 531 is rotated or driven by engine power.

The clutch drum 539 is formed integral with the shaft 531 on the right end thereof. Within the clutch drum 539, a hub member 541 (the second rotary member) is rotatably supported by a support portion 543 disposed between the clutch drum 539 and the hub member 541 and a bearing 545 fixed by a retainer 547 attached to the clutch drum 539. A drive pinion shaft 549 is spline coupled with the hub member 541.

This pinion shaft 549 is supported by the carrier 533 via bearings 551, and a lock nut 553 is screwed into the pinion shaft 549. A drive pinion gear 555 is formed on the right end of the pinion shaft 549, and geared with a ring gear 309 of a rear differential gear assembly 521 (shown in FIG. 2).

The clutch drum 539 is formed with splines 559 at the inner circumference thereof. Outer clutch plates 563 of an the pilot multidisk clutch 561 and a push ring 565 are axially slidably engaged with these splines 559 on the left side. Retainers 567 are fitted to the right side of the push ring 565. The hub member 541 is formed with a large-diameter portion 569 and a small-diameter portion 571. A first cam ring 573 is axially movably fitted to the small-diameter portion 571. A thrust washer 577 and a bearing 579 are disposed between the left side wall 575 of the clutch drum 539 and the first cam ring 573. The first cam ring 573 is formed with splines 581 at the outer circumference thereof, and inner clutch plates 583 are axially slidably engaged with the splines 581 of the first cam ring 573 in alternate juxtapose positional relationship with respect to outer clutch plates 563 axially slidably engaged with splines 559 of the clutch drum 539.

An electromagnet 585 is disposed on the left side of the left wall 575. A york 587 of the electromagnet 585 is fixed to the carrier 533 with bolts 588. Two annular air gaps S are formed between two projectinos 589 of the york 587 and two annular projections 591 of the side wall 575 so as to form a magnetic circuit. Further, a non-magnetic member 594 or a cavity is formed between the two annular projections 591.

When the electromagnet 585 is energized, a push ring 565 is attracted by the electromagnet 585, so that the pilot multidisk clutch 561 is engaged by the push ring 565 and further the first cam ring 573 is coupled with the clutch drum 539.

Outer clutch plates 597 of a main multidisk clutch 595 are axially slidably engaged with the splines 559 of the clutch drum 539. Inner clutch plates 101 thereof are axially slidably engaged with splines 599 formed on the large-diameter portion 569 of the hub member 541 in alternate juxtapose positional relationship with respect to the outer clutch plates 597.

Further, a second cam ring 503 is axially slidably disposed between the two clutches 561 and 595. The inner circumference of the second cam ring 503 is axially slidably engaged with the small-diameter portion 571 of the hub member 541, and the right side projection 505 of the cam ring 503 is axially slidably engaged with the splines 599 formed in the large-diameter portion 569 of the hub member 541. Further, the hub member 541 is formed with oil passages 507 and 509 to introduce lubricant into the clutch drum 539 and the main multidisk clutch 595 disposed within the carrier 533 Further, a cam mechanism 513 is formed between the first cam ring 573 and the second cam ring 503 with balls 511 sandwiched therebetween as shown in FIG. 8(B).

In the coupling apparatus, when the pilot multidisk clutch 561 is engaged, the clutch drum 539 (the first rotary member) and the hub member 541 (the second rotary member) are coupled via the pilot clutch 561, the first cam ring 573, the cam balls 511, and the second cam ring 503, so that an engine power is transmitted from the rear differential gear 521 to the rear wheels 27 and 29 (shown in FIG. 2). In this case, the second cam ring 503 is moved in the rightward direction by a thrust force 517 generated by the cam mechanism 513 due to a transmission torque 515, so that the main multidisk clutch 595 is pushed toward the right side wall 519 of the clutch drum 539 to generate a large engagement force. The thrust reaction force 521 is received by the clutch drum 539 via the thrust bearing 579 and the washer 577 in such a way that two opposite direction forces can be cancelled with each other by the clutch drum 539.

The engagement force of the main multidisk clutch 595 can be adjusted by adjusting the engagement force (sliding force) of the pilot multidisk clutch 561, that is, by changing a transmission torque 515 applied to the cam mechanism 513 or the thrust force 517. When the pilot multidisk clutch 561 is disengaged open, since the thrust force 517 is not generated, the main multidisk clutch 595 is disengaged open, so that the coupling apparatus is released. As described above, in the coupling apparatus of the present invention, since the clutch engagement torque can be adjustably transmitted, it is possible to obtain a large clutch engagement force in spite of a compact size. Further, the air gaps S are not subjected to the influence of abrasion of the two multidisk clutches 561 and 595.

Further, since the second cam ring 503 is axially slidably engaged with the splines 559 formed on the large diameter portion 569 of the hub member 541 (not on the small-diameter portion 571), it is possible to obtain a large sliding resistance in spite of the small sliding force. Therefore, the slidable motion of the second cam ring 503 is smooth; the thrust force can be transmitted efficiently; a large engagement force can be obtained; and there-fore the clutch engagement operation is stable. Further, the splines 599 formed on the large-diameter portion 599 of the hub member 541 are used in common for both the inner clutch plates 501 and the second cam ring 503, it is unnecessary to provide an additional coupling member for the second cam ring 503, thus reducing the cost of the apparatus.

The function of the coupling apparatus will be explained in relation to the power transmission system of a vehicle shown in FIG. 2.

Drive power from an engine 1 is speed changed by the transmission 3 and distributed through the center differential gear 5 to the front left and right wheels 11 and 13 and to the propeller shaft 17 via the 2-4 WD switch mechanism 17.

When the coupling apparatus is disengaged open, engine power is not transmitted to the rear wheels 27 and 29, so that the vehicle is driven in FF (front engine front drive) mode to improve the fuel consumption rate.

When the coupling apparatus is engaged, since engine power is transmitted to the rear wheels 27 and 29 according to the engagement force, so that the vehicle is driven in 4 WD mode. Therefore, in case one of front and rear wheels is sliped on a muddy road, since the engine power is transmitted to the other non-slipping wheels, the vehicle can be driven out of the slippery road. Further, since the engine power transmitted to the rear wheels can be adjusted by controlling the engagement force of the electromagnetic pilot multidisk clutch 561, it is possible to lock the coupling apparatus by a large engagement force of the main multidisk clutch 595.

Further, since the differential motion between the front and rear wheels can be controlled by the slipping motion of the two multidisk clutches 561 and 595, the coupling apparatus 519 can be function as a center differential gear disposed between the front and rear wheels. Therefore, the vehicle can be turned smoothly without producing tight corner braking phenomenon produced as when the vehicle is put into a garage at a low speed at a shaft turn. Further, it is also possible to improve the vehicle straight driving stability by increasing the differential limitation power between the front and rear wheels.

Further, in this embodiment, it is also possible to dispose the electromagnetic pilot multidisk clutch 561 on the side of the hub member 541 and further to axially slidably engage the second cam ring 503 with the splines 559 formed on the large-diameter portion of the clutch drum 539, in order to further reduce the sliding resistance of the second cam ring 503.

As described above, in the coupling apparatus provided with two clutches according to the present invention, since the main multidisk clutch is engaged by a cam thrust force generated between the two cam rings whose relative rotation speed can be controlled by the pilot clutch adjustably engaged according to the attractive force of the electromagnet or the air piston, it is possible to obtain a large and stable engagement force of the main clutch in spite of a compact apparatus size, without being directly subjected to the influence of multidisk friction abrasion or fluctuation in friction coefficient between friction plates of the pilot clutch. In addition, since a first direction that the pilot clutch is actuated into engagement is opposite to a second direction that the main clutch is actuated into engagement, the main clutch operation is stable without being directly subjected to the variation of characteristics of the clutch actuator, the pilot clutch and the cam ring members. Further, the air gaps S between the electromagnet and the member of the apparatus will not vary-after the pilot clutch friction plates have been worn away, it is possible to stably generate a constant cam thrust force by the electromagnet via the pilot clutch.

What is claimed is:

1. A coupling apparatus provided with double clutches, comprising:
   (a) first rotating means (31);
   (b) second rotating means (47) differentially coupled to said first rotating means;
   (c) third rotating means (53) disposed coaxially with said second rotating means and differentially coupled to said first rotating means;
   (d) main clutch means (75) disposed between said first and third rotating means, for controllably transmitting a rotative motion between said first and third rotating means when controllably engaged;
   (e) cam ring means (79) disposed coaxially with said first, second and third rotating means and said main clutch means, for controllably engaging only said main clutch means when axially slidably actuated;
   (f) pilot clutch means (87) disposed between said cam ring means and said first rotating means, for axially slidably actuating said cam ring means when controllably engaged; and
   (g) pilot clutch actuating means (89) for controllably engaging said pilot clutch means to axially slidably actuating said cam ring means so that said main clutch means is controllably engaged.

2. A coupling apparatus provided with double clutches, incorporated with a planetary differential gear assembly housed within a transfer case, comprising:
   (a) a planetary carrier;
   (b) a sun gear shaft disposed coaxially with said planetary carrier;
   (c) main clutch means, disposed between said planetary carrier and said sun gear shaft, for controllably transmitting a rotative motion between said planetary carrier and said sun gear shaft when controllably engaged;
   (d) cam ring means, disposed coaxially with said planetary carrier and said sun gear shaft and said main clutch means, for controllably engaging only said main clutch means when axially and slidably actuated;
   (e) pilot clutch means, disposed between said cam ring means and said planetary carrier and rotatable within the transfer case, for axially and slidably actuating said cam ring means when controllably engaged; and
   (f) pilot clutch actuating means for controllably engaging said pilot clutch means to axially and slidably actuate said cam ring means so that said main clutch means is controllably engaged.

3. A coupling apparatus provided with double clutches, incorporated with a planetary differential gear assembly housed within a transfer case, comprising:
   (a) a differential case;
   (b) a sun gear;
   (c) main clutch means, disposed between said differential case and said sun gear, for controllably transmitting a rotative motion between said differential case and said sun gear when controllably engaged;
   (d) cam ring means, disposed coaxially with said differential case and said sun gear and said main clutch means, for controllably engaging only said main clutch means when axially and slidably actuated;
   (e) pilot clutch means, disposed between said cam ring means and a rotary case rotatable within the transfer case, for axially and slidably actuating said cam ring means when controllably engaged; and
   (f) pilot clutch actuating means for controllably engaging said pilot clutch means to axially and slidably actuate said cam ring means so that said main clutch means is controllably engaged.

4. A coupling apparatus provided with double clutches, incorporated with a rear differential gear assembly housed within a differential carrier, comprising:
   (a) a planetary carrier;
   (b) a sun gear shaft;
   (c) main clutch means, disposed between said planetary carrier and said sun gear shaft, for controllably transmitting a rotative motion between said planetary carrier and said sun gear shaft when controllably engaged;
   (d) cam ring means, disposed coaxially with said planetary carrier and said sun gear shaft and said main clutch mean, for controllably engaging only said main clutch means when axially and slidably actuated, said cam ring means being in engagement with a differential case;

(e) pilot clutch means, disposed between said cam ring means and said planetary carrier rotatable within a differential carrier case, for axially and slidably actuating said cam ring means when controllably engaged; and (f) pilot clutch actuating means for controllably engaging said pilot clutch means to axially and slidably actuate said cam ring means so that said main clutch means is controllably engaged.

5. A coupling apparatus provided with double clutches, mounted on any one of front and rear wheel drive shaft sides of a 4-wheel drive vehicle, comprising:

(a) a coupling shaft connected to a propeller shaft;

(b) a drive pinion shaft of a rear differential gear;

(c) main clutch means, disposed between said coupling shaft and said drive pinion shaft, for controllably transmitting a rotative motion between said coupling shaft and said drive pinion shaft when controllably engaged;

(d) cam ring means, disposed coaxially with said coupling shaft and said drive pinion shaft and said main clutch means, for controllably engaging only said main clutch means when axially and slidably actuated;

(e) pilot clutch means, disposed between said cam ring means and a clutch drum fixed to said coupling shaft, for axially and slidably actuating said cam ring means when controllably engaged; and (f) pilot clutch actuating means for controllably engaging said pilot clutch means to axially and slidably actuate said cam ring means so that said main clutch means is controllably engaged.

* * * * *